No. 619,850. Patented Feb. 21, 1899.
H. SPÜHL.
CHAIN WELDING MACHINE.
(Application filed Mar. 7, 1898.)
(No Model.) 4 Sheets—Sheet 1.
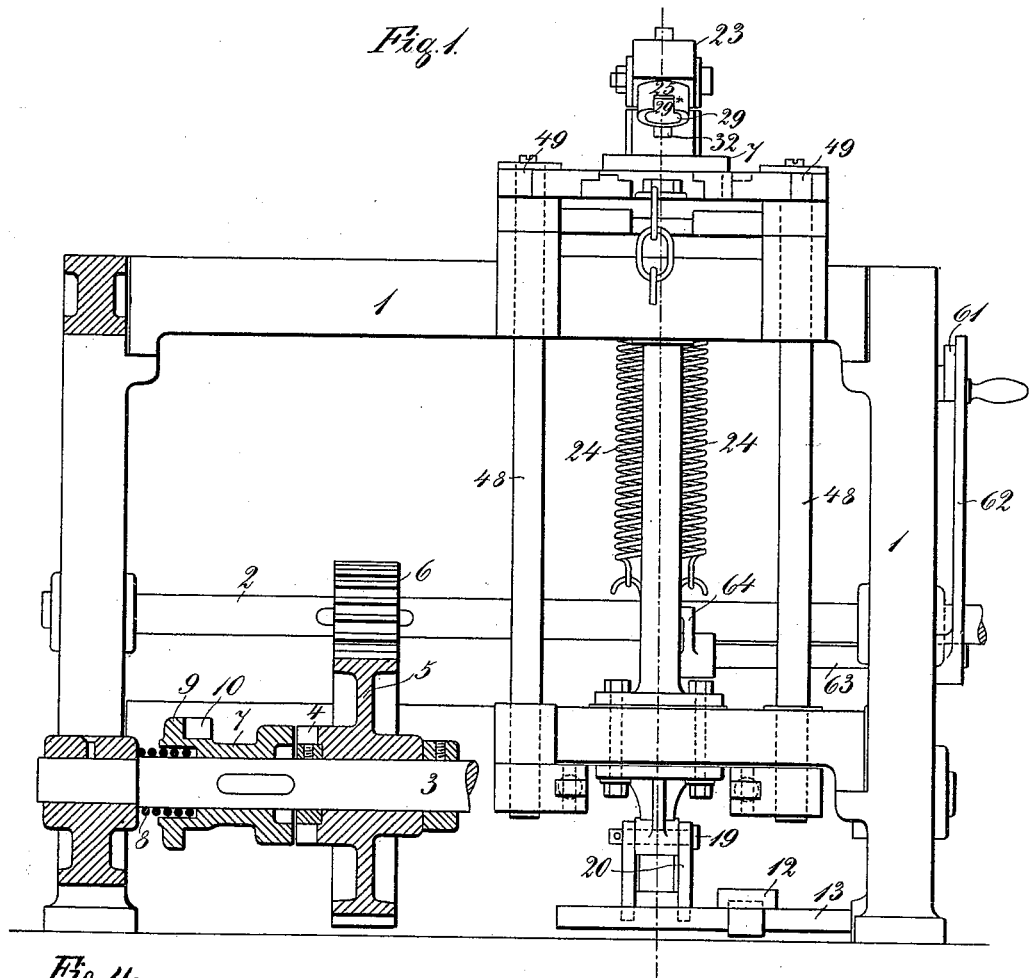
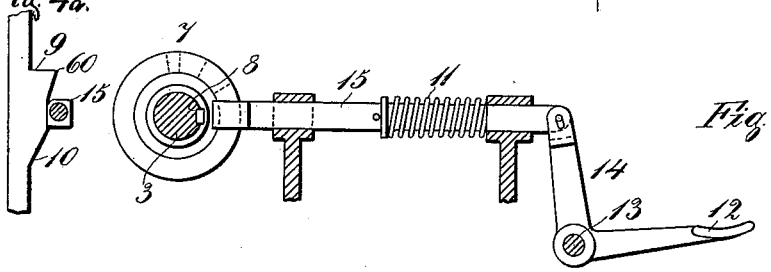
Witnesses:
Carl Ruf.
Ernie Thayset.
Inventor:
Heinrich Spühl.
by Robert Pinla
Attorney.

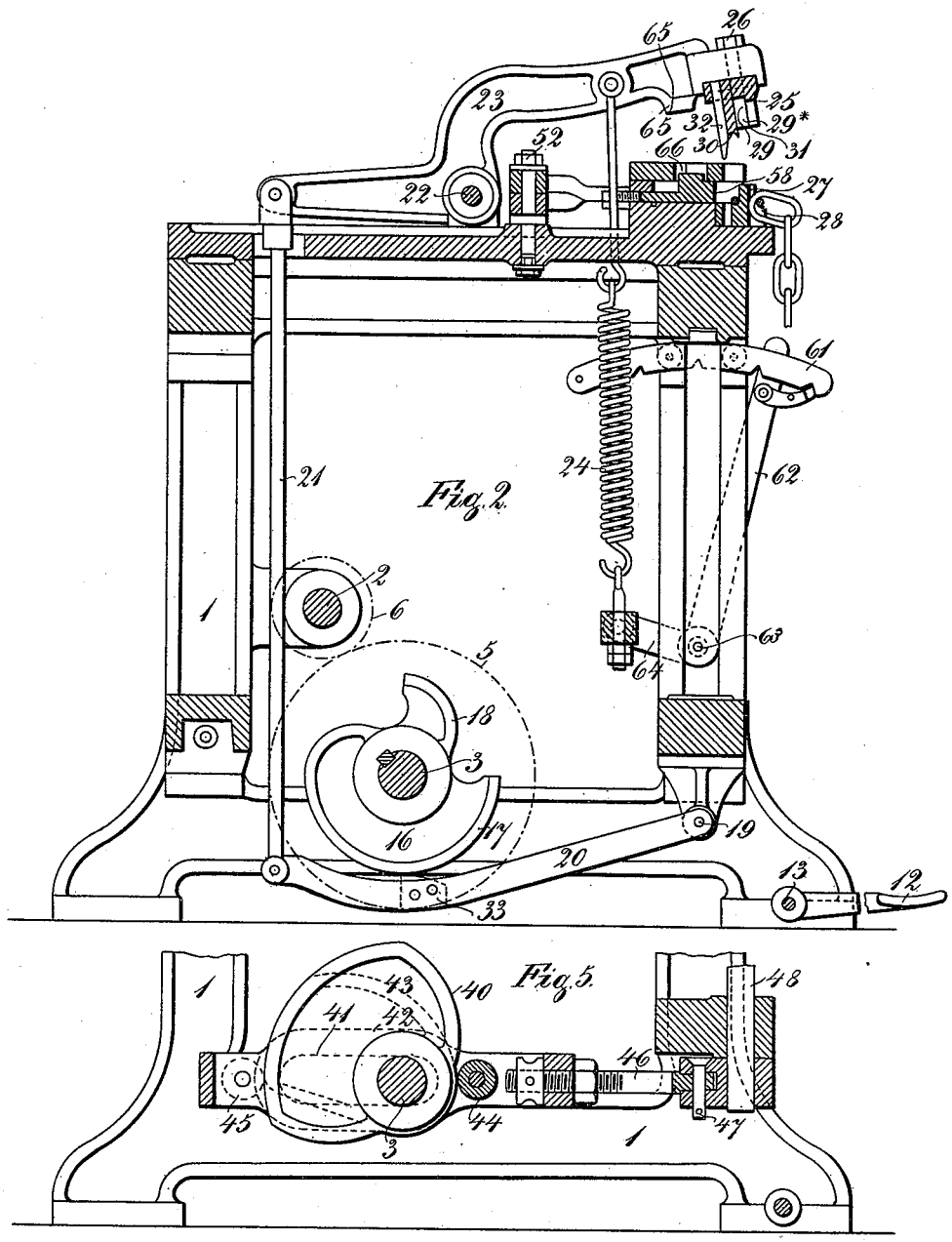

No. 619,850. Patented Feb. 21, 1899.
H. SPÜHL.
CHAIN WELDING MACHINE.
(Application filed Mar. 7, 1898.)
(No Model.) 4 Sheets—Sheet 3.
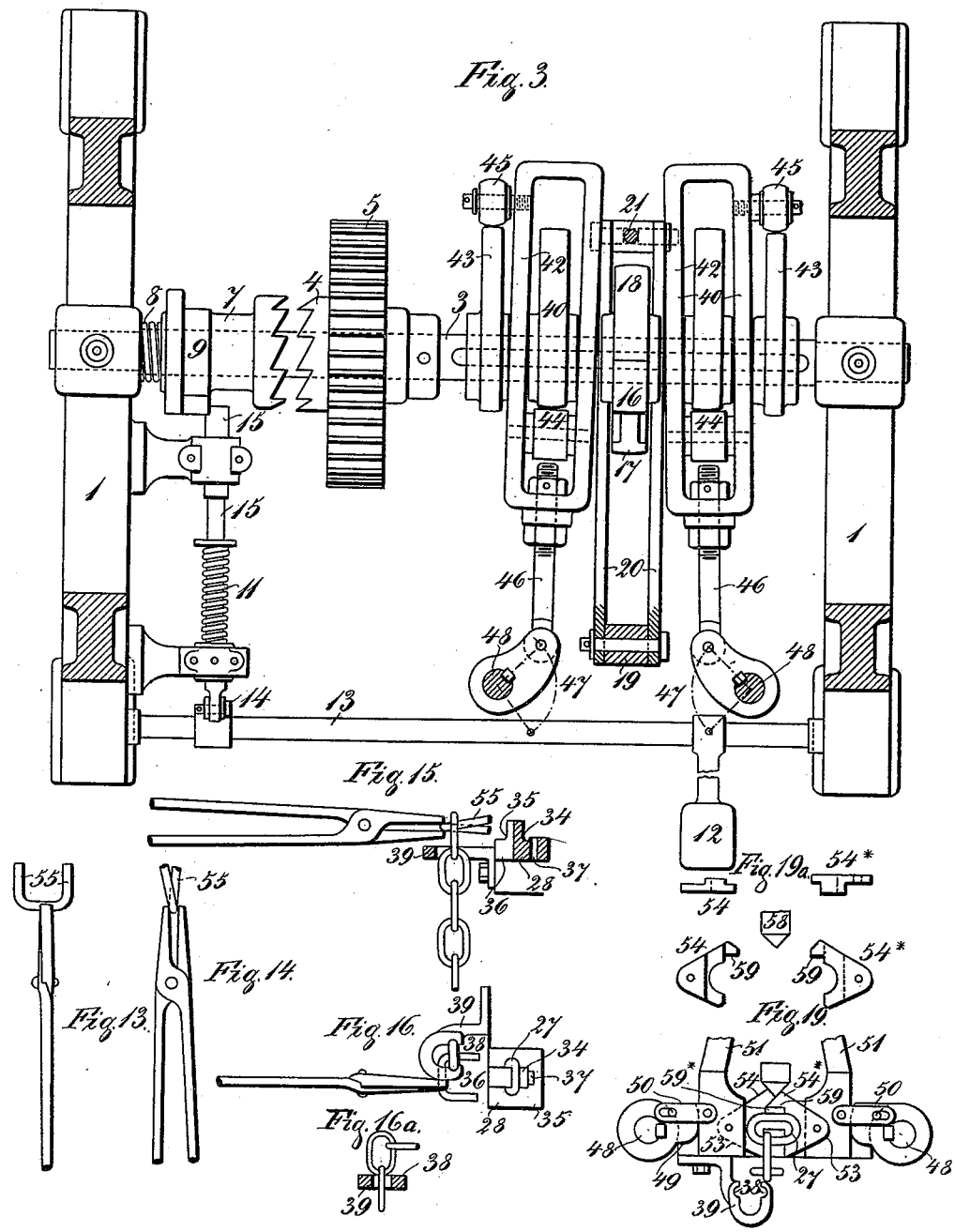
Witnesses:
Carl Ruff.
Emil Kayser.
Inventor:
Heinrich Spühl.
by Robert Winter
Attorney.

No. 619,850. Patented Feb. 21, 1899.
H. SPÜHL.
CHAIN WELDING MACHINE.
(Application filed Mar. 7, 1898.)
(No Model.) 4 Sheets—Sheet 4.
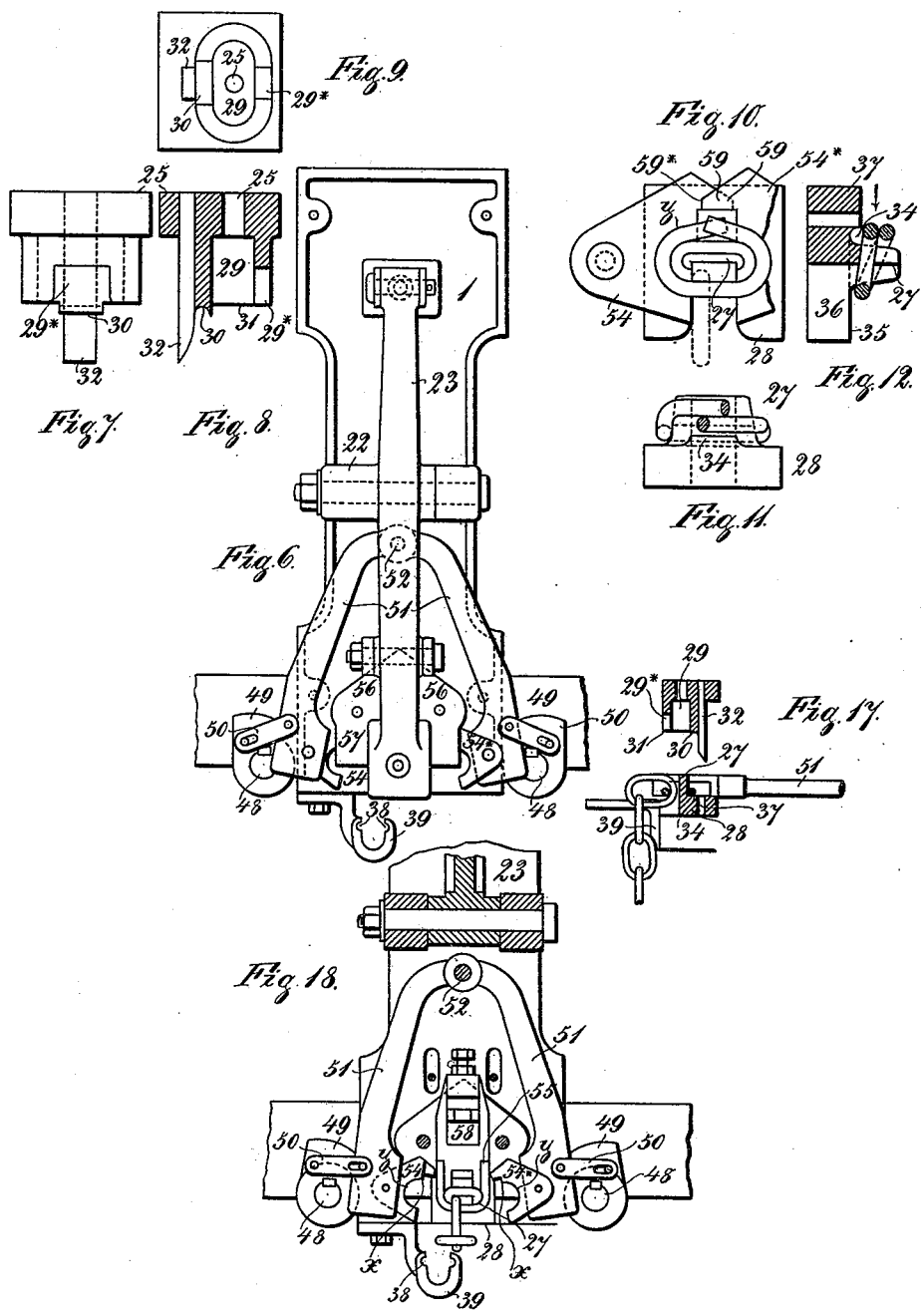
Witnesses:
Carl Ruf.
Emil Kayser.
Inventor:
Heinrich Spühl.
by Robt Ruhler
Attorney.

UNITED STATES PATENT OFFICE.

HEINRICH SPÜHL, OF ST. GALLEN, SWITZERLAND.

CHAIN-WELDING MACHINE.

SPECIFICATION forming part of Letters Patent No. 619,850, dated February 21, 1899.

Application filed March 7, 1898. Serial No. 673,011. (No model.)

*To all whom it may concern:*

Be it known that I, HEINRICH SPÜHL, a citizen of Switzerland, and a resident of St. Gallen, Switzerland, have invented certain new and useful Improvements in Chain-Welding Machines, (for which applications for patents were filed in Switzerland on the 25th of October, 1897, in Germany on the 4th of January, 1898, in Austria on the 17th of January, 1898, in France on the 27th of January, 1898, and in Russia on the 16th of January, 1898,) of which the following is an exact specification.

This invention relates to improvements in machines for welding the links of chain and rolled wire or round iron.

Chain-welding machines hitherto known are open to the main objection that in many cases not enough attention has been paid to the welding, and therefore in such cases a really good joint was not obtained.

The strong and efficient manner in which a chain or, more precisely, chain-links can be welded by hand has, as far as I am aware, not yet been attained by a machine.

Previous inventors seem to have regarded as the chief object of their invention the bending by mechanical means of a rod or of an already partly-formed link to a complete link and subsequently welding the link to the part of the chain already formed, whereby the welding was effected without the tapering of the ends of the link—that is to say, the link ends were simply placed together or joined at the circumference, the ends of the links tapered, and placed one over the other before being united. The welding of the links was, however, by these means not always successfully accomplished.

Continued and extended experiments have shown that to effectively weld chains several hammer blows are necessary, whereby the first blow causes the weld to take place and the following blows simply produce a closer density of the material. It has been tried to replace or to unite the chain-links by pressure; but even though the application of pressure may be advantageous and serviceable for welding larger pieces of work, yet applying pressure does not give satisfactory results in the case of welding chains, most probably for the reason that the welding heat of larger pieces of metal must, as is immediately apparent, last considerably longer than the welding heat of a chain-link of small section. Furthermore, it may be stated that blunt welding—viz., simply pressing the ends of the links one against the other—and taper welding—viz., placing the tapered ends of the links the one over the other—have been proved to be good in theory, but not satisfactory in practice, as these blunt or tapered ends of the link burn in the welding heat to a shapeless porous mass, and therefore subsequently do not in the slightest degree fit over or against each other. Not even the largest chain-link has a section large enough to admit of being welded with blunt ends, for which reason the ends of the link must be placed one over or above the other before welding, and even then an efficient welding of the parts or of the ends of the links is not attainable without hammer blows. It may also happen, even with long experience, as hereinbefore indicated, that the operator allows too much of the material to burn in the welding heat before commencing the welding of the link.

My invention, hereinafter more fully described, obviates the disadvantages above mentioned and possesses the characteristic feature that a swage is employed for holding the link, which swage is given a semicircular shape at the point of welding, whereas the remaining portion of the swage possesses a flat shape, which insures that only the place of weld can be hit by the hammer under all circumstances.

Hitherto when using swages which had a semicircular section throughout their entire surface it was and must always be exceedingly difficult, if not impossible, to each time exactly direct the hammer blows to the place of weld, as in such cases—namely, when employing an entirely semicircular swage—the part of the link which has not been weakened by the excessive heat of the fire would also receive a part of the blows from the hammer. Furthermore, another necessary point to be considered in attaining a good welding of the chain-link is that the ends of the link at welding heat should not come in contact with the swages until the welding can actually take place, as otherwise a too early or premature cooling of the parts would take place. This necessary condition has not yet up to the present, in my opinion, received sufficient attention.

I have endeavored by my invention to produce a machine in which the drawbacks above described have been considered and overcome.

In my improved machine the obliquely-inclined shanks of the U-shaped preliminary bent links are placed or bent one over the other in such manner that the ends of the same brought to a welding heat do not for the purpose of avoiding a too early cooling come in contact with the shaping cheeks or swages until the welding can take place, whereby the swage-hammer effects the welding at the first blow after a cam upon the hammer-swage has forced the welding ends to the right position, and whereby, further, the upper and lower swage have a semicircular section only at the point or place of welding, so that the weld must under all circumstances be hit by the falling hammer and a solid and thorough welding effected, such solid and thorough welding being obtained not only at the weld or welding-point, but, furthermore, the parts surrounding the weld are again brought by the hammer blows into a solid condition, said parts having become porous in the welding heat; but now in consequence of the lateral increased density of the material, also produced by the hammer blows, said parts become, as hereinbefore indicated, considerably strengthened and united.

I have illustrated my improved chain-welding machine in the accompanying drawings, in which—

Figure 1 shows an elevation in section, Fig. 2 a vertical section, Fig. 3 a plan, and Fig. 4 a detailed view, of the mechanism for putting the machinery in and out of gear; Fig. 4ª, a detailed view of the disconnector. Fig. 5 shows a detail view of the driving parts of the shaping-cheeks. Fig. 6 shows a plan of the welding devices. Figs. 7, 8, and 9 show the top swage in elevation, section, and plan. Figs. 10, 11, and 12 show the lower swage with a bent, but not yet welded, chain-link, in plan, rear view, and section. Figs. 13 and 14 show two views of a link prepared for the welding. Figs. 15 and 16 show the chain-holder, in section and plan. Fig. 16ª is a view showing the chain-holder in section. Fig. 17 shows a vertical section through the upper and lower swage. Fig. 18 shows a plan of the shaping-cheeks when open, and Fig. 19 shows the same in a closed position. Fig. 19ª is a diagrammatic view of cheeks 54 and piece 58.

Referring to the drawings, in the machine-frame 1 a shaft 2, which continually rotates, is journaled, said shaft, by means of a cog-wheel 6, setting in motion the wheel 5, said wheel 5 being loosely located upon the eccentric-shaft 3 and provided with coupling-teeth 4. Upon the shaft 3 is a coupling 7, securely fixed as regards the rotating direction, but yet movable in an axial direction. A coil-spring 8 upon the said shaft 3 is so arranged that the tension of the same acts in the direction toward bringing the coupling 7 into engagement with the wheel 5. Furthermore, the said coupling 7 possesses a disconnector 9, having an inclined surface 10. (See Fig. 4ª.) Upon the rotation of the coupling 7 the said inclined surface 10 strikes against a rod 15, said rod being forced forward by means of spring 11 and being capable of being pressed backward by the pedal-gear 12 13 14, whereby the coupling 7 is disconnected, for the reason that the rod 15 cannot move in a lateral direction. (See Figs. 3 and 4.)

Upon the eccentric-shaft 3 the cam 16 is located, Figs. 2 and 3. The same is provided with two parts or projections 17 and 18, said cam having the purpose of actuating a pair of levers 20, pivoted at 19 in the frame 1. The said pair of levers are connected by means of the rod 21 with the double-armed striking-lever 23, journaled at 22 in the frame 1, the front arm of said lever 23 bearing the tension of the springs 24.

Upon the striking-lever 23 the swage 25 is arranged, said upper swage 25 being secured to the said lever 23 by means of the set-screw or bolt 26. The said upper swage 25 is provided with a central widened and curved aperture or recess 29 to receive the inner projecting portion 27 of the lower swage 28, Figs. 7 to 9. Furthermore, to the part 25, Fig. 7, is attached the swage portion 30, arranged to strike upon the welding surface or point, said part 30 having a flat recessed surface, which therefore does not receive the hammer blows, as well as a cam 32, the purpose of which will be hereinafter explained.

As soon as the cam 17 upon the intermediate part 33 has passed over the double lever 20 the springs 24 accelerate the fall of the striking-lever 23, whereby upon each rotation of the shaft 3 two blows are given corresponding to the two cam parts 17 and 18.

The lower swage 28, located upon and attached to the machine-frame, Figs. 10 and 12, is provided with the lower swage portion 34, said part 34 being the lower swage proper for the weld and having a flat surface 35 to receive the remaining parts of the link; also, a recess 36 and an aperture 37 for the reception of the cam 32, Figs. 10 and 17.

Immediately in front of the lower swage 28 is a chain-holder 39 to receive the link last welded, said chain-holder 39 being provided with link-supports 38, (clearly shown in the under portion of Fig. 16,) said chain-holder also being attached to the machine-frame, Figs. 15 to 19. The weight of the suspended portion of the chain keeps the top chain-link in its proper upright position in the holder 39. (See Fig. 16ª.)

Upon the shaft 3 are two eccentrics 40, Figs. 3 and 5, while the sliding frames 42, arranged loosely upon the shaft 3, are provided with slots 41 in such manner that by means of the eccentric 40 they can be moved forward and by means of the eccentric 43 (also located upon and fixed to the shaft 3) they can be moved backward. The action of the eccentrics 40 and 43 upon the frames 42 takes place by means of the central part of the rollers 44 and 45.

The to-and-fro movements of the frames 42 are transmitted by rods 46 and levers 47 upon vertical shafts 48. Hereby further intermediate parts are avoided and it is possible that the frames 42 between the rods 46 and levers 47 can make a slight swinging movement in a horizontal plane upon the shaft 3. (See Fig. 3.)

The top ends of the shafts 48 carry striking-cams 49, Figs. 1, 6, and 18, which are connected by means of joints 50 with arms 51 of the shaping-cheeks. The arms 51 can rotate around the pivot 52 and carry at their ends 53 the shaping-cheeks 54 and 54*, Figs. 18 and 19, which have the purpose of bringing together and bending over each other the inclined shanks of the U-shaped bent chain-link 55, Figs. 13 and 14.

It has been proved necessary in practice that the shaping-cheeks 54 and 54* should be provided with a lug 59, Fig. 19, so that when the shank is bent upon the edges $x$, Fig. 18, the said lug would grip between the shanks of the links.

The plate 57, secured by screws 56, Fig. 6, holds the arms 51 and the shaping-cheeks 54 and 54* in the proper position—viz., in the position in which the cheek 54 partly takes under the opposite cheek 54*, Fig. 19. Fig. 19ª is a diagrammatic view of the cheeks 54 and 54* in plan and side view of the wedge-shaped piece 58.

The *modus operandi* of my improved chain or link-welding machine is as follows: As soon as a U-shaped chain-link 55, heated at its lower end to welding heat, has been passed through the preceding link of the chain, (said link being held by the chain-holder 39,) Figs. 13 and 14, and after the said link has been placed with the said previous link upon the lower swage, Fig. 18, in such manner that the ends to be welded are in a somewhat elevated position to avoid contact with the cold parts of the swage and the consequent cooling of the heated ends of the link the welding-machine is set in motion by pressure upon the foot device 12. The eccentrics 40 come now first into action and effect the closing of the arms 51 and the cheeks 54 and 54* by means of the parts or organs 42, 46, 47, 48, 49, and 50. Hereby the under shank of the chain-link 55 is lifted from the lug 59 of the under shaping-cheek 54, Fig. 19, and bent around the projecting portion 27, while the bending of the upper part of the link is effected by the lug 59 of the upper shaping-cheek 54*. (See Figs. 10 to 12.) By the striking of the cheeks 54 and 54* against the inclined surfaces of the wedge-shaped piece 58 the proper position of the said cheeks is maintained. The arrangement of the lugs or extensions 59 upon the cheeks 54 and 54* is such that between the former and the swage portion proper, 34, of the under swage 28 an opening 59* is formed when the said shaping-cheek is in a closed position, Figs. 10 and 19. This is for the purpose of allowing the cam 32 to pass and to prevent contact with the heated ends of the link to be welded. To obviate cooling of the welding ends by a premature contact of the inner sides with the projecting surface 27 of the lower swage 28, the semicircular recess $y$ is made so wide that the said shaping-cheeks do not bend the weld ends quite up to the projecting surface 27, a small space remaining from the same. (See Figs. 10 and 12.) Thus neither upon the outer side or the under side nor upon the inner side does a premature contact of the link ends to be welded take place with the parts of the swage or with the shaping-cheeks, and therefore no premature cooling of these heated ends can take place. After the shanks of the chain-links, by means of the striking-cam 49 and joints 50, which are set in motion by the shafts 48 and levers 47, have been bent to the desired degree the movement of the eccentric 16 has in the meantime so far advanced, that the lever-bar 20 can first slide over the cam part 17 and immediately after a second time over the cam part 18. Hereby the striking-lever 23, in consequence of the action of the springs 24, causes two successive hammer blows to be given, whereby the ends of the chain-link lying one above the other are welded, all of which operations take place in quick succession. The parts of the link surrounding the point or place of the weld have, as hereinbefore indicated, also become somewhat porous in consequence of the action of the fire. These parts, however, by the material being again pressed together at each side and in consequence of the hammer blows are once more so compressed that they again receive their normal strength. The two swage parts 30 and 34 cause the weld to have the proper cylindrical form. The other portion of the link, in consequence of the same already possessing a semicircular form, does not receive any blows from the hammer, the said remaining portions of the link being, as indicated, located in the recessed and flat portion of the swage. Upon the sinking of the striking-lever 23 the cam 32 enters the hollow space 59*, Fig. 19, between the shaping-cheek lug 59 and the part of the swage 34, as well as in the opening 37 of the lower swage 28. The said cam 32 is rounded at its front lower side, Figs. 8 and 17, the chief purpose of which is to press the ends of the link to be welded over the swage part 34 at the moment when the hammer falls, said parts having been held back, as hereinbefore described, by the surface 27 for the purpose of avoiding a premature cooling. The cam 32 has also the further object of avoiding a fin or joint mark along the line of the weld, as no material can be pressed out toward the side of this cam. After the two blows have been given the striking-lever 23 is again lifted by the large cam 16. Hereupon the two return eccentrics 43 come into action and effect the opening of the arms 51 by aid of the parts 42, 46, 47, 48, 49, and 50 and the shaping-cheeks 54 and 54*. After completion of one rotation the coupling 7 is automatically disengaged from the wheel 5 by means of the rod 15 and the disconnector 9, this effecting the stoppage of the machine. The projection 60, Fig. 4ª, bearing against the rod 15, limits the movement of the coupling 7. Immediately after the opening of the shaping-cheeks the welded link can be lifted out of the under swage and placed in the chain-holder 39, whereupon the welding of another link can be taken in hand.

The strength of the blows of the levers 23, or, in other words, the tension of the springs 24, can be regulated by means of a lever 62, movably adjustable upon the segment 61 by the shaft 63 and by the lever 64, Figs. 1 and 2.

In order to avoid the injurious effect of possible dead blows, the lever 23 is provided with a hammer-head 65, Fig. 2, which strikes against an anvil 66 of the wedge-shaped piece 58 before the upper and lower portions 30 and 34 of the swage can come in contact with each other.

Having thus fully described the nature of this invention, what I desire to secure by Letters Patent of the United States is—

In a chain-welding machine, the combination of a frame 1, a toothed wheel 6 upon a shaft 2, a toothed wheel 5 upon a shaft 3, said toothed wheel 5 engaging with the said toothed wheel 6, a cam 16 provided with two parts or projections 17 and 18, two levers 20 pivoted at 19 and actuated by said cam parts 17 and 18, a striking-lever 23 pivoted at 22, rods 21 and springs 24 actuating said lever 23, an upper swage 25 upon said lever 23, a curved recess 29 upon said swage 25, an inner swage proper 30, a cam 32 and flat recess surface 31, an under swage 28 having the lower swage portion 34 and flat surface 35, a recess 36 and aperture 37 adapted to receive the said cam 32, a chain-holder 39 provided with link-supports 38, said holder 39 being immediately in front of the lower swage 28, eccentrics 40, rollers 44 and 45, a sliding frame 42 moved in a forward direction by the said eccentrics 40, and provided with slots 41, eccentrics 43, adapted to effect the backward movement of said frame, rods 46 and levers 47 transmitting the to-and-fro movement of the shaft 48, joints 50, arms 51, the said joints 50 connecting the shaft 48 with the said arms 51, shaping-cheeks 54 and 54*, upon which the shanks of the U-shaped links are bent, and a lug 59 engaging between the shanks of the links, all operating substantially and for the purpose as described.

In witness whereof I have hereunto set my hand in presence of two witnesses.

HEINRICH SPÜHL.

Witnesses:
 JOSEPH HIKELS,
 JOSEPH SIMON.